United States Patent
Dilz, Jr.

(10) Patent No.: US 6,378,367 B1
(45) Date of Patent: *Apr. 30, 2002

(54) MINIATURE SPORTS RADAR SPEED MEASURING DEVICE

(75) Inventor: Albert E. Dilz, Jr., Cincinnati, OH (US)

(73) Assignee: Sports Sensors, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/550,735

(22) Filed: Apr. 17, 2000

Related U.S. Application Data

(63) Continuation-in-part of application No. 09/471,905, filed on Dec. 23, 1999, and a continuation-in-part of application No. 09/471,906, filed on Dec. 23, 1999, which is a continuation-in-part of application No. 09/233,556, filed on Jan. 20, 1999, now Pat. No. 6,079,269, which is a continuation of application No. 08/796,665, filed on Feb. 5, 1997, now Pat. No. 5,864,061.

(60) Provisional application No. 60/113,378, filed on Dec. 23, 1998, and provisional application No. 60/113,434, filed on Dec. 23, 1998.

(51) Int. Cl.$^7$ .................................................. G01P 1/07
(52) U.S. Cl. ......................................... 73/488; 73/167
(58) Field of Search ........................... 73/488, 657, 167, 73/514.27; 273/371, 378; 473/415, 180, 190, 192, 198, 199, 458, 451, 455; 342/115, 104, 99

(56) References Cited

U.S. PATENT DOCUMENTS

| | | |
|---|---|---|
| 3,781,879 A | 12/1973 | Staras et al. |
| 3,852,743 A | 12/1974 | Gupta |
| 3,895,366 A | 7/1975 | Morris |
| 3,896,435 A | 7/1975 | Constant |
| 4,030,097 A | 6/1977 | Gedeon .................. 73/167 |
| 4,184,156 A | 1/1980 | Petrovsky et al. .............. 343/8 |
| 4,276,548 A | 6/1981 | Lutz |
| 4,509,052 A | 4/1985 | Cash |
| 4,759,219 A | 7/1988 | Cobb et al. |
| 4,801,880 A | 1/1989 | Koike |
| 4,915,384 A | 4/1990 | Bear |
| 5,092,602 A | 3/1992 | Witler et al. ............. 273/184 R |
| 5,133,213 A | 7/1992 | Bernstein et al. |
| 5,199,705 A | 4/1993 | Jenkins et al. |
| 5,315,306 A * | 5/1994 | Doughty et al. ............. 342/192 |
| 5,401,026 A | 3/1995 | Eccher et al. |
| 5,419,549 A | 5/1995 | Galloway et al. |
| 5,471,405 A | 11/1995 | Marsh |
| 5,553,846 A | 9/1996 | Frye et al. |
| 5,570,094 A | 10/1996 | Armstrong |
| 5,723,786 A | 3/1998 | Klapman |
| 5,761,096 A | 6/1998 | Zakutin |
| 5,779,555 A | 7/1998 | Nomura et al. |
| 5,796,354 A | 8/1998 | Cartabiano et al. |
| 5,864,061 A * | 1/1999 | Dilz, Jr. ....................... 73/488 |

* cited by examiner

Primary Examiner—Helen Kwok
(74) Attorney, Agent, or Firm—Wood, Herron & Evans, L.L.P.

(57) ABSTRACT

A sensor is provided for measuring the speed of a moving sports object, for example, a ball such as a baseball or softball. The sensor is operable over a short range and is preferably mounted in close proximity to the path of the moving object. For measuring the speed of a ball, the sensor is preferably mounted on or in a ball glove or is otherwise mounted on the forearm of a person catching or otherwise receiving or interacting with the ball, for example, by wearing the sensor on such person's wrist. The sensor measures the speed, for example, of a ball about to be caught and displays the speed of the ball to the catching player. The sensor of the preferred embodiment utilizes CW Doppler radar in the form of a microwave radio frequency transmitter and receiver that has a single-transistor integrated antenna/oscillator. A simple, low cost unit having a low radiation and low energy consumption transmitter, receiver and signal processor, is provided. In use, the unit is situated so as to place a transmit/receive antenna close to or in the line of motion of the object. Such an antenna, so positioned, may be separated from the unit and connected through a transmission line. The sensor is useful for other speed measurements in sports applications. Bat speed is measured by placing the antenna in and near the top of a batting tee, with the circuitry in the base of the tee. Martial arts measurements of punch and kick speed are made with the antenna in a target pad held by a coach or trainer. Paint ball gun marker velocity can be calibrated with a sensor antenna on the gun barrel.

5 Claims, 4 Drawing Sheets

MINIATURE SPORTS RADAR SPEED MEASURING DEVICE

This application is a Continuation-In-Part of:

U.S. patent application Ser. No. 09/233,556, filed Jan. 20, 1999 now U.S. Pat. No. 6,079,269, which is a Continuation of U.S. patent application Ser. No. 08/796,665, filed Feb. 5, 1997 and now U.S. Pat. No. 5,864,061;

U.S. patent application Ser. No. 09/471,905, filed Dec. 23, 1999, which is based on U.S. Provisional Patent Application Serial No. 60/113,378, filed Dec. 23, 1998; and U.S. patent application Ser. No. 09/471,906, filed Dec. 23, 1999, which is based on U.S. Provisional Patent Application Serial No. 60/113,434, filed Dec. 23, 1998.

All of the above identified applications are hereby expressly incorporated herein by reference.

FIELD OF THE INVENTION

This invention relates to speed measuring devices particularly suited for use in determining velocity magnitude or speed of sports objects, and more particularly, to low cost, low energy radar devices for use in measuring the speed of baseballs, baseball bats, paint balls from paint ball guns, and other sports objects, or the speed of movements by martial artists and other players, particularly during training.

BACKGROUND OF THE INVENTION

Continuous wave (CW) Doppler radar technology is commonly utilized to detect a moving object illuminated by the electromagnetic field of the radar and producing an electrical signal at a Doppler frequency which is a measure of the relative speed of the moving object. This technology has been pioneered and developed by the defense industry in the United States, is well documented in textbooks and reports, and has found numerous applications in consumer products. Security motion sensors, industrial position sensors and police radar units are examples of current uses of Doppler radar systems.

Doppler radar has been used in sports applications to measure the velocities of sports objects or players relative to one another or relative to a reference point. Examples of sports radar in use are found in U.S. Pat. No. 4,276.548 to Lutz and U.S. Pat. No. 5,199,705 to Jenkins et al. Conventional sports radar includes "speed guns" for measuring baseball or softball speed, such as disclosed in the Lutz patent. Available sports radar units generally occupy approximately 200 cubic inches and cost several hundred dollars. These units are typically operated by a third person somewhat remote from the thrower and receiver.

Implementation of prior art CW Doppler radar systems is relatively complex, generally involving the use of an RF oscillator and signal generator, an antenna system to radiate the oscillator output into free-space and to receive a portion of the transmitted electromagnetic energy that is reflected by the moving object, a transmit/receive switch, diplexer, or circulator device if a single antenna is used for both transmit and receive rather than separate transmit and receive antennas, and various local oscillators, mixers, phase-locked-loops and other "front-end" circuits to heterodyne, demodulate and detect the Doppler signal. This complexity imposes high cost and size requirements on the radar units, which have heretofore discouraged the utilization of CW Doppler technology in consumer applications where extremely small size and low cost are necessary for practical end product realization.

In electronics applications unrelated to those discussed above, Doppler radar systems using simple homodyne circuits have been known. Such applications include defense applications such as ordnance proximity fuzes and target detectors where Doppler modulation provides evidence of a target encounter. Validation of the presence of target signals within a prescribed Doppler frequency passband and the detection of amplitude build-up as the target encounter distance decreases are sufficient for signal processing and decision making in such systems, obviating the need to accurately measure or calculate the specific velocity magnitude or speed. For example, for general proximity sensing applications, mere detection of an increasing distance signal is satisfactory. However, applications requiring a speed measurement necessitate determination of the specific Doppler frequency and a calculation of a corresponding speed value. Such homodyne circuits are but among hundreds or thousands of circuits and modulation schemes that in some way carry speed information but which have not been considered practical for providing speed measurements. Accordingly, circuits of a size or cost that are practical for consumer applications such as sports object speed measurement have not been known or available.

Existing Doppler speed measuring devices suffer from loss of accuracy due to the inability to place the unit in the line of the moving object, resulting in a reduction in the speed measurement to the cosine of the angle between the object's velocity vector and the line of the Doppler signal between the unit and the moving object. Further, the Doppler units must be positioned where they are not subjected to damage by collision with the object.

Accordingly, a need exists for a low cost, effective, small size, low power device useful for measuring and displaying the speed of objects in consumer applications such as sports and sports training.

SUMMARY OF THE INVENTION

A primary objective of the present invention is to provide a small size, low cost, low power device for measuring object speed that is practical for consumer applications such as sports. It is a particular objective of the present invention to provide a sports radar unit for measuring and displaying the velocity magnitude or speed of a sports object such as a baseball. Further objectives of the invention are to provide such a speed measurement apparatus and method for measurement of baseball speed, baseball bat speed, for calibrating paint ball marker speed, for martial arts punch and kick speed measurements and other applications, particularly in training.

According to principles of the present invention, there is provided a CW Doppler radar speed sensor that is small in size, low in cost, low in power consumption and radiated energy, that measures and displays the speed of an object such as a baseball and displays the measured speed to a user. Further according to principles of the present invention, a device is provided that is adapted for mounting at or near the path or point of reception of the moving object, or at the "target point" at which the moving object is directed. Such positioning facilitates the use of a low power, short range signal and accurate velocity measurement. The unit preferably transmits and receives RF energy in a microwave frequency range, preferably of a frequency of approximately 2.4 GHz or 5.8 GHz or higher, such as in the 10–25 GHz range.

The device according to one preferred embodiment of the invention, includes a radar transmitter and receiver that employs a single simple CW Doppler homodyne circuit preferably having an oscillator-detector that is based on a single transistor, which utilizes resonant circuit elements of the oscillator as an antenna to radiate energy into free-space. A portion of the radiated energy strikes the nearby moving object and is reflected back to the oscillator-antenna circuit where it is mixed with the oscillator signal. The coherent relationship of the transmitted and received signals in a simple homodyne circuit produces a Doppler frequency modulation as the distance to the moving object changes.

The preferred embodiment of the present invention makes use of the phenomena whereby, at a given separation distance between the radar and the moving object, the received object-reflected signal is exactly in-phase with, and reinforces, the oscillator signal, but as the separation distance changes by each one-quarter wavelength of the transmitted signal, the total two-way travel distance to the object and back changes by one-half wavelength, resulting in an out-of-phase or canceling relationship between the received and transmitted signals. Each distance change of one-half wavelength results in a two-way radar round trip change of one wavelength, thus producing one complete cycle of modulation. As the distance to the moving object changes by successive one-half wavelength increments, multiple cycles of modulation are produced. The frequency of this modulating signal is the Doppler frequency, which is equal to the velocity of the moving object expressed in terms of one-half wavelengths of the transmitted signal as follows:

$$f_D = \frac{v}{\lambda_t/2} = \frac{2vf_t}{c}$$

where: $f_D$ is the frequency of Doppler modulation,
  $v$ is the relative velocity of the moving object,
  $\lambda_t$ is the wavelength of the transmitted signal,
  $f_t$ is the frequency of the transmitted signal,
  $c$ is the magnitude of the velocity of electromagnetic energy propagating in surrounding medium (free-space in this case) and is equal to the product of frequency and wavelength.

In the preferred embodiment of the invention, this resulting Doppler signal which modulates the oscillator signal is detected by filtering it out of the incoming signal, amplifying it, filtering it again and converting it to a digital signal, preferably using a zero-crossing detector (ZCD). The output of the ZCD is ideally a square wave having a frequency that is the Doppler frequency. The detected digitized Doppler frequency signal is applied to the input port of a microprocessor, which measures the time between negative-going zero-crossings using an internal timer. The measurement of zero-crossing intervals are compared to certain criteria to verify that a valid signal is being processed. Then a Doppler frequency value is calculated from the measured zero-crossing information by taking the time between zero-crossings in the same direction as is equal to the period of the Doppler frequency. Using the above formula, the velocity of the moving object toward the sensor, for example, the speed of a thrown ball approaching the sensor, is then calculated. The calculated velocity magnitude is displayed on a small liquid crystal display (LCD).

The radar unit of the preferred embodiment of the invention is preferably located in approximately a direct line with, or at only a slight angle to, the flight of the ball or other object whose speed is being measured. It is also preferably located such that the object passes within one or a few feet of the device somewhere in the path of the object, such as at the endpoint or point of catch. This arrangement preferably places the object within a few inches of the radar unit and moving directly toward the unit so that the speed of the object is measured within close proximity to the unit. In certain embodiments of the invention, the antenna of the unit is positioned in or very close to the path of the moving object with a signal processing portion of the unit positioned remote from the antenna and connected to the antenna by a transmission line. The antenna is preferably of a fixed length and, when remote from the other circuitry of the unit, is connected to the circuitry with a coaxial, parallel conductor or other transmission line that is impedance matched and designed into the RF detector circuitry.

In the case of a baseball, a preferred location for the unit, or at least the antenna portion of the unit, is on the catching forearm of the person catching the ball, preferably on the hand or wrist of the catching player. In one preferred embodiment, the unit is supported on or in a baseball glove worn on the hand of the user, preferably at the web portion thereof or behind the fingers of the user in line with the path of the ball. By so locating the unit, or providing the unit with a short range of effectiveness of less than ten feet, and preferably of from one to three feet, velocity errors due to off-line location are minimized, since the Doppler frequency represents the velocity of the object in a direction toward or away from the radar unit. Glove location of the radar also allows detection of the approaching ball within very close proximity to the unit and just before the baseball enters the glove pocket. Alternatively, the unit can be mounted on the catcher's wrist, hand or elsewhere on the user's forearm. This positioning fixes the relationship of the unit to the path of the ball and minimizes transmitter output power requirements, and corresponding battery power supply needs. With one preferred embodiment of the invention, transmitter output power can thus be in the order of microwatts, which is much less than the radiated power levels of most wireless consumer products such as cellular and portable telephones. Short range detection also avoids false readings of speed due to the motions or movement of the thrower.

With the baseball speed measuring radar unit mounted on the receiver's forearm, such as on a baseball glove, the display is preferably positioned on the unit itself facing rearwardly so that the receiver can read the output upon catching the ball. Mounted on the receiver's wrist, the antenna portion of the radar unit is preferably worn on the front of the wrist facing the thrower while the display is mounted on the back of the wrist so it is visible to the catcher, with both the antenna and display portions being secured by the same wrist band, with the band containing a flat cable interconnecting the two portions. The LCD, battery, power supply, and the two switches are located in a module on the back of the wrist. In this embodiment, the unit can include a real time such as that of a conventional digital wristwatch, which can share the battery and power circuit with the speed measuring device and utilize the display of the device to display time of day or elapsed time.

The radar velocity sensor can be operated from a 2.5 VDC battery power supply, requiring an average current of less than one milliampere. Thus, a single 3 volt nominal lithium cell capable of 160 milliampere-hours can power the sensor for a relatively long duration. Small, inexpensive cylindrical and button configuration lithium cells with this energy capability are readily available and are widely used in consumer products. Power "ON/OFF" and "Reset" switches are provided which are easily operated by the nongloved hand of the receiver before each succeeding throw is delivered.

The velocity measurement device of the present invention is capable of being miniaturized and produced inexpensively so that it can be used in consumer applications, which, up to now, have not heretofore been addressed by the prior art, It can be built into, or attached to, a baseball or softball glove, to measure the speed of the ball being caught. The radar can be worn on throwing arms of persons "tossing" a ball or by others batting, throwing, catching or otherwise dealing with moving objects in sports or other recreational uses. Gloves can be designed to conveniently incorporate the radar in a pouch, within a glove thumb, finger or heal pad, or held by straps, bands, hook and loop fasteners or effective means. A radar unit can be built directly into the glove. Gloves may be used in various sports applications, and may be considered to include hand and other forearm garments or body fastening structures or devices. In the preferred embodiments, the unit or the antenna of the unit is situated behind the glove or other target with the radiated and reflected signals passing through the glove or target.

In certain embodiments of the invention, a bat speed measuring device and method are provided in which an RF antenna is positioned in or near the path of a bat, such as on a post upstanding from a home plate or other base. The post may be a ball support post of a batting tee. The antenna is a fixed length antenna having a defined radiating length and connected to the end of a transmission line. Preferably, the antenna is at the top of the tee or other post and the transmission line extends from the antenna through the post to a signal processor in or near the base or beyond the base at a location that is out of the path of the swinging bat and immune from being struck and damaged by the swinging bat. The signal processor includes an RF detector matched and tuned to the transmission line and the antenna and a digital processor that converts the RF Doppler signal to numerical speed measurement data. The processor may include or be linked to a display or computer, either by wire or other solid link or through a wireless circuit so the measurement data can be read by a coach or the person swinging the bat.

In another embodiment of the invention, speed measurement is provided in martial arts training to measure the speed of punches and kicks. Preferably, a speed measurement device or antenna thereof is provided behind a target pad that is held by a coach or trainer or is fixed to a support, so that a trainee punching or kicking the pad can have the hand or foot speed measured.

Also according to the present invention, speed measurement of other sports objects is also provided in applications where small portable, devices may be used. For example, paint ball guns used in survival games and training, use air pressure to propel paint balls or markers at other players. To avoid injury to the players being shot with the markers, the velocity of the markers at the barrels of the guns is limited to, for example, 300 feet per second. To optimize the trajectory of the markers, it is desirable to calibrate the guns so that the marker is as close to the upper velocity limit without going over the limit. One embodiment of the invention contemplates the fixing of a speed measuring unit or the antenna thereof on the barrel of the marker gun closely adjacent the barrel with the antenna aimed parallel to the barrel and the path of the marker. The device is adjusted to process Doppler readings for a speed range of, for example, 150 to 400 feet per second.

These and other objectives and advantages of the present invention will be more readily apparent from the following detailed description of the of the preferred embodiments of the invention, in which:

DETAILED DESCRIPTION OF THE PREFERRED EMBODIMENT

Figure 1:
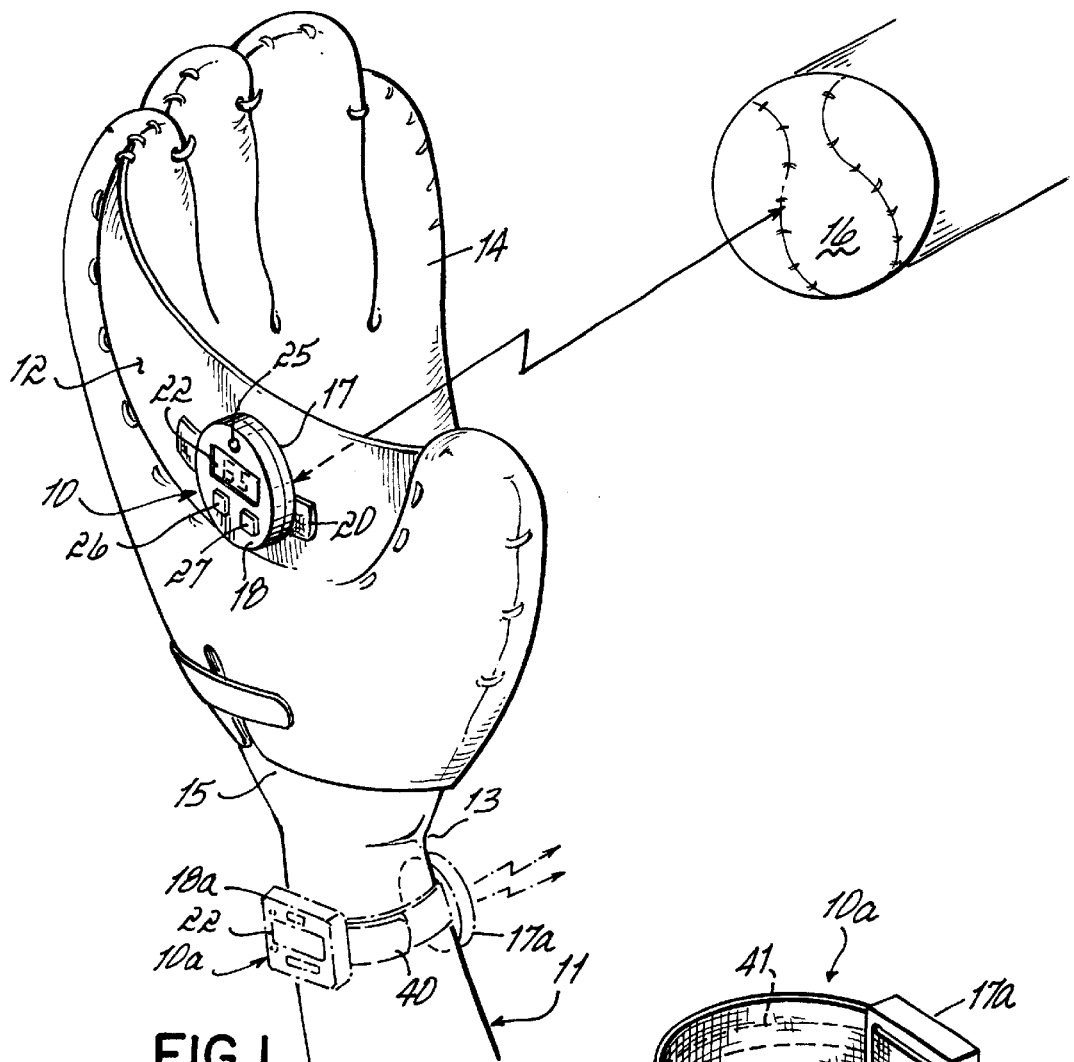
FIG. 1 is a perspective view of the catching arm of a baseball player utilizing baseball speed measuring embodiments of a device embodying principles of the present invention.

FIG. 1 illustrates one embodiment of a speed measuring device or unit 10, according to principles of the present invention, secured to the back of the web 12 of a baseball glove 14 on the forearm of the catching arm 11 of a person catching a thrown baseball 16 to measure the speed of the ball.

The device 10, so secured to the baseball glove 14, is located on the user's hand in or within a few inches of the direct path of movement of the baseball 16 being caught. The device has a two part plastic housing that includes a forward facing housing 17 and a rearward facing housing 18. In the illustrated embodiment of the unit 10, the two parts of the housing 17, 18 are secured together to form a single enclosure that contains the electronics of the unit 10. The forward facing housing 17 is secured by a fastening element 20, for example, a two part hook and loop fastener such as that sold under the trademark VELCRO, and encloses an antenna 21 (FIGS. 2 and 3) with a radiation pattern having a main lobe that faces through the web 12 of the glove 14 and in the general direction of the incoming baseball 16. The rearward facing housing 18 contains a speed output annunciator, for example, a visual display 22 such as an LCD having, for example, a digital readout of two to four digits. On the rearward facing housing 18 there is also provided a plurality of user accessible control buttons 25–27. One button 25 is a unit on/off switch. A second button 26 is a mode switch that permits sequential selection of the units of the display 22, for example, in miles per hour, kilometers per hour, feet per second or meters per second. A third button 27 is a reset or start button that powers the transmitter for a predetermined amount of time, such as ten or fifteen seconds, after which the transmitter of the unit will turn off.

Figure 2:
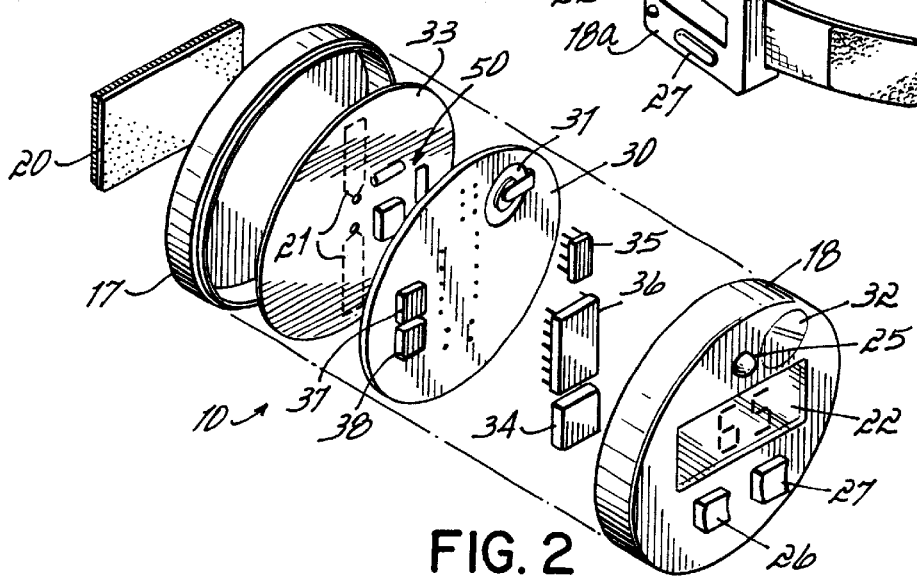
FIG. 2 is an exploded perspective view of the speed measuring device of FIG. 1.

As further illustrated in FIG. 2, between the forward and rearward facing housings 17 and 18 is a circuit board 33 that contains the transmitting and receiving circuitry, and a signal processing circuit board 30 that contains the signal processing and logic of the unit 10. The circuit board 30 includes a battery 31 that is replaceable through an access door 32 in the rearward facing housing 18. The board 33 contains components and circuitry of a transmitter/oscillator circuit, which includes the strip transmission line resonator/antenna 21. The circuit board 30 contains a signal filter and processor 34 that processes the detected Doppler signal that is produced in the RF circuit by the moving object, an operational amplifier-based voltage regulator chip 35 that provides filtered regulated voltage to the signal processor chip 34 at about one-half the supply voltage of the battery 31, a microprocessor 36 that digitizes output from the signal processor 34 and interprets the detected signal as a speed reading and communicates the interpreted signal to the display 22, and clock and delay circuits 37, 38, respectively, that are used by the microprocessor 36.

Figure 1A:
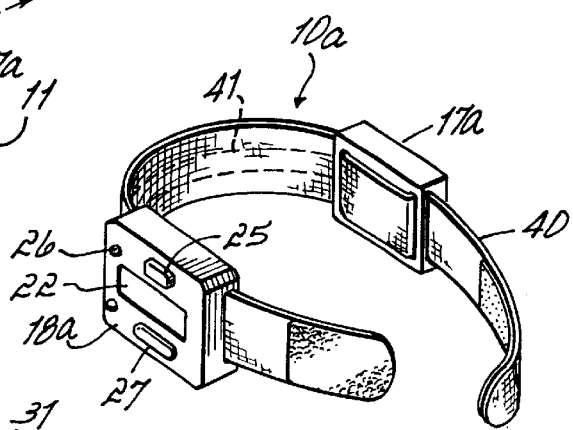
FIG. 1A is a perspective view of an alternative embodiment of the speed measuring device of FIG. 1.

An alternative embodiment of the unit 10a is illustrated in FIG. 1A and is configured for attachment to the wrist 13 of the catching arm 11 of the person catching the baseball 16, on the catcher's forearm, below the elbow, so that the unit is maintained at a constant distance from the path of the ball. With the wrist mounted unit 10a, forward and rearward facing housings 17a, 18a, respectively, are separate enclosures that are secured with a wrist or arm band 40 on opposite sides of the wrist 15 of the catcher, so that the forward facing housing 17a faces the arriving object 16 while the rearward facing housing 18a faces the catcher. The separate housings 17a, 18a are electrically interconnected through the conductors of a ribbon cable 41 contained in the band 40. The forward facing housing 17a contains at least the antenna 21 while the rearward facing housing 18a contains at least the display 22 and the buttons 25–27. The circuit board 30 and the components and devices thereon may be contained in either housing. Preferably, the Doppler sensor 33 and the Doppler signal processor 34 are contained in the forward facing housing 17a in close proximity to the antenna 21, while the microprocessor 36 and related circuits 37, 38 are contained in the rearward housing 18a in close proximity to the display 22.

Figure 3A:
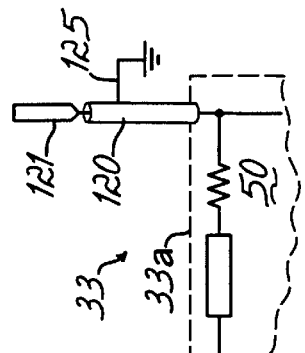
FIG. 3A is a schematic block diagram of the RF detector and antenna portion of the circuitry of FIG. 3 illustrating an embodiment having a remote antenna.
Figure 3:
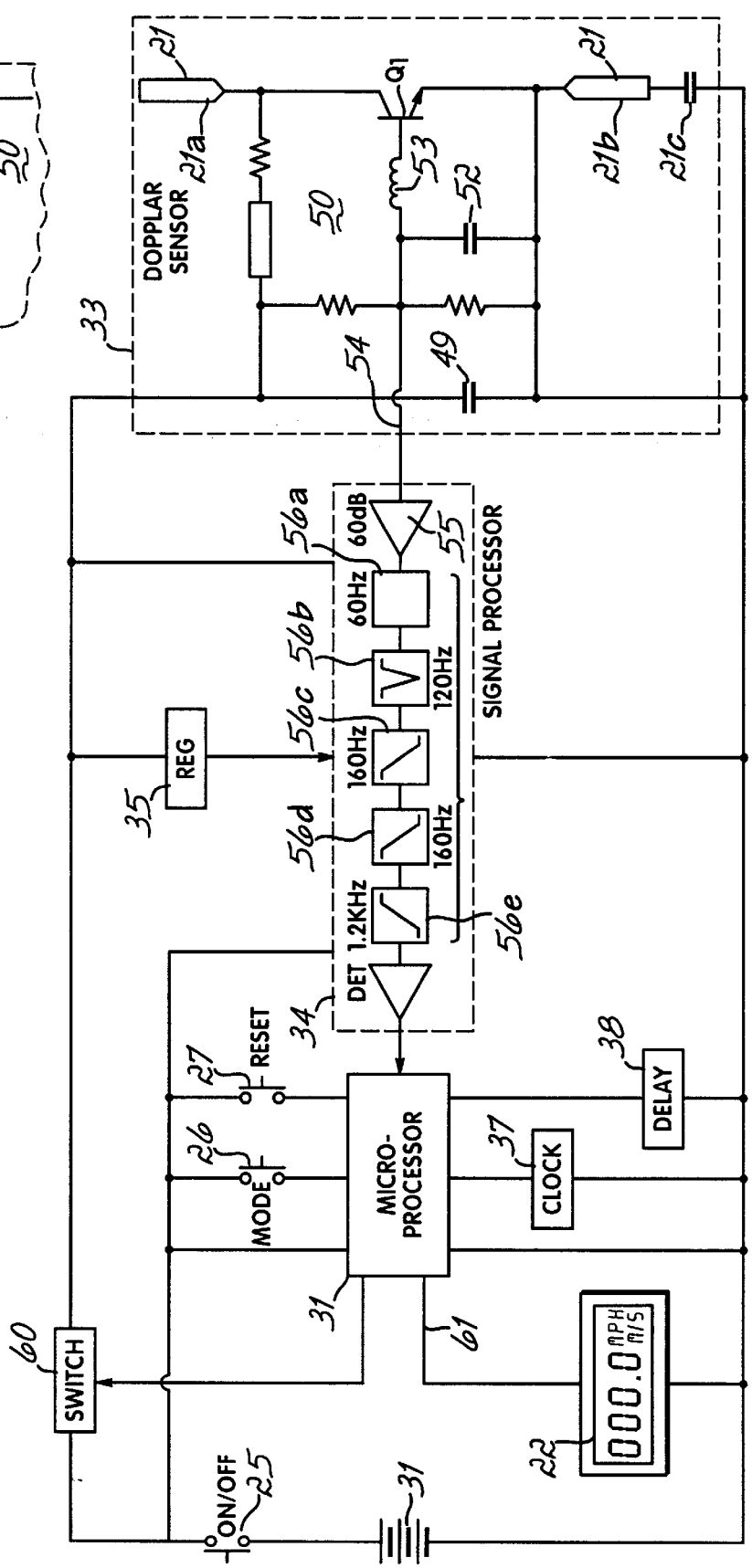
FIG. 3 is a schematic block diagram of one embodiment of circuitry of the speed measuring device of FIG. 1.

The electronics of the units 10, 10a illustrated in FIG. 3 can be fabricated utilizing readily available components. The Doppler sensor circuit 33 is preferably a CW radar homodyne oscillator-detector 50 having an integral antenna circuit by which the moving object 16 is detected. The oscillator preferably operates at between 2400–2425 MHZ, but may operate at other frequencies, typically in the 2,000 to 10,000 MHZ region. The oscillator 50 of the preferred embodiment draws about 0.6 milliamperes from a 2.5 VDC power source such as the battery 31. Partially because of the location and configuration of the units 10, 10a, less than ten microwatts need be transmitted into free-space by the oscillator resonant elements. These elements are preferably of a strip transmission line configuration that includes two electrically equivalent quarter wave micro-strip lines that form radiating elements 21a, 21b of the antenna 21. The elements 21a, 21b, along with a transistor Q1 and a coil 53, form a negative resistance network which oscillates with a capacitor 21c at the operating carrier frequency of, for example, 2.4 GHz. A transmission line 51 and capacitor 49 are provided to prevent parasitic oscillations in the bias network. Capacitor 52 is a bypass capacitor which creates a low impedance to ground for the carrier frequency, partially filtering the carrier signal at an outlet 54 at which the received Doppler signal can be extracted. Typical objects the size of a baseball or softball within a distance of about two feet from the radar, produce a reflected Doppler frequency signal having an amplitude in the 10 to 100 microvolt range. This signal modulates the oscillator signal at the Doppler sensor output 54 of the sensor circuit 33.

A portion of the modulated oscillator signal that has been filtered within the oscillator circuit 33 and fed on the outlet 54 into the signal processor 34 consisting of a commercially available AC or capacitively coupled high-gain differential amplifier 55, several stages of filters 56 and a ZCD 57. The gain of the differential amplifier 55 is preferably set at a gain of about 1000, or 60 dB. The filters 56 produce a 150 to 1200 Hz passband, which covers the range of anticipated Doppler frequency signals encountered in baseball and softball applications with the above oscillator frequency. The filters 56 include, for example, standard twin-tee configuration operational amplifier based 60 Hz and 120 Hz notch filters 56a, 56b to suppress AC power circuit interference. The filters 56 also include two second-order, multiple feedback high-pass filters 56d, 56e each having a gain, for example, of 2.7, and each having a 3 dB cutoff frequency of 160 Hz. Next, the filters 56 include a single order passive low-pass filter 56e having, for example, a 3 dB cutoff frequency of 1200 Hz. The passband can be tailored to fulfill specific needs by selection of the corresponding low and high pass filter component values which establish the corner frequencies. The amplified and filtered signal from the filtering stages 56 is fed to the ZCD 57, which is a standard Schmitt trigger that uses a commercial comparator, with positive feedback to create hysteresis. The ZCD produces a square-wave which is output and applied to the input of an eight-bit microprocessor 36.

The microprocessor 36 is connected to external clock circuit 37 which provides a time reference to the microprocessor 36. The microprocessor 36 is programmed to verify the validity of the received signal, for example, by requiring at least four consecutive Doppler frequency cycles, which causes it to recognize the received signal as a valid Doppler signal reading. When a reading is determined to be a valid Doppler signal reading, the microprocessor calculates the corresponding velocity. The microprocessor 36 has an output 61 that communicates a signal representative of the calculated Doppler speed measurement through appropriate drivers (not shown) to the LCD 22 for display. The calculation is made by detecting successive negative edge zero-crossings following the depression of the reset button 27, which triggers a microprocessor interrupt that samples the clock 37 to cause the times of each crossing to be stored and so the intervals between them can be calculated. The sampling is terminated after 26 successive negative transitions are stored, or there has been a dead time of at least ⅙ second since the last transition, indicating that the object or target is no longer moving. Once the data has been captured, the differences between transition times are calculated, from which the Doppler frequency is determined. In making the calculations, the microprocessor 36 enhances the speed reading validity by starting with the difference between the first two recorded time readings and then looking for a sequence of at least three consecutive periods that are within 25% of each other. If none is found, the process is started over and additional readings are stored. When three consecutive readings within 25% of each other are found, the data is scanned until three consecutive readings are not within 25% of each other, whereupon the calculations are averaged. The averaged calculated Doppler frequency value is then converted to the selected units and displayed. Velocity can be displayed in miles per hour, kilometers per hour or meters per second in the preferred embodiment, selectable by the user by way of the MODE switch 26, which is a pushbutton switch which, when depressed, sequentially steps the display 22 through the various units, as is convenient for the user.

The electronics are powered by a power supply formed of the battery 31 which is connected/disconnected by the ON/OFF switch 25, which controls signal power to the microprocessor 36, the signal processor 34 and display 22. However, the oscillator transmitter circuit power is controlled by the READY, or RESET switch 27 through the microprocessor 36 when the battery power switch 25 in "ON". Activation of the RESET switch 27 causes the microprocessor 36 to close a transmitter power switch 60 which applies electrical power to the transmitter/Doppler sensor circuit 33 for a prescribed time interval (e.g. 10–15 seconds) controlled by the time delay circuit 38, or until an object velocity signal is calculated as controlled by the microprocessor 36, whichever occurs first, after which the transmitter 33 and signal processor circuit 34 are deactivated as the microprocessor causes the switch 60 to turn "OFF". Activation of the RESET switch 26 causes the microprocessor 36 to reset the LCD 22, which is holding the previously calculated velocity value, and to re-apply power to the transmitter 33 and signal processor 34 for performing the next detection and velocity measurement. In this manner, the transmitter radiated output is limited to just the period of time of actual measurement usage, and battery power is also conserved.

Easily packaged in a volume of about 1–3 cubic inches are: a single transistor oscillator-detector-antenna circuit 33, signal processor 34 with the Doppler bandpass amplifier and the zero-cross detector, eight-bit microprocessor velocity calculator and transmitter controller 36, liquid crystal display 22, single-cell battery power supply 31 and ON/OFF and RESET switches 26, 27. For example, the specific embodiment described above can be packaged in a volume of less than two cubic inches using discrete circuit components, and, with appropriate utilization of a custom application-specific integrated circuit (ASIC) and at a frequency of about 5.8 GHz, the device can be packaged in a volume of approximately one half cubic inch. At higher frequencies of 10 to 25 GHz, which can be used, the package size will be essentially the preferred size of the display.

More detailed embodiments of the speed measuring device described above are described in pending U.S. patent application Ser. Nos. 09/471,905 and 09/471,906, referred to above.

Figure 4:
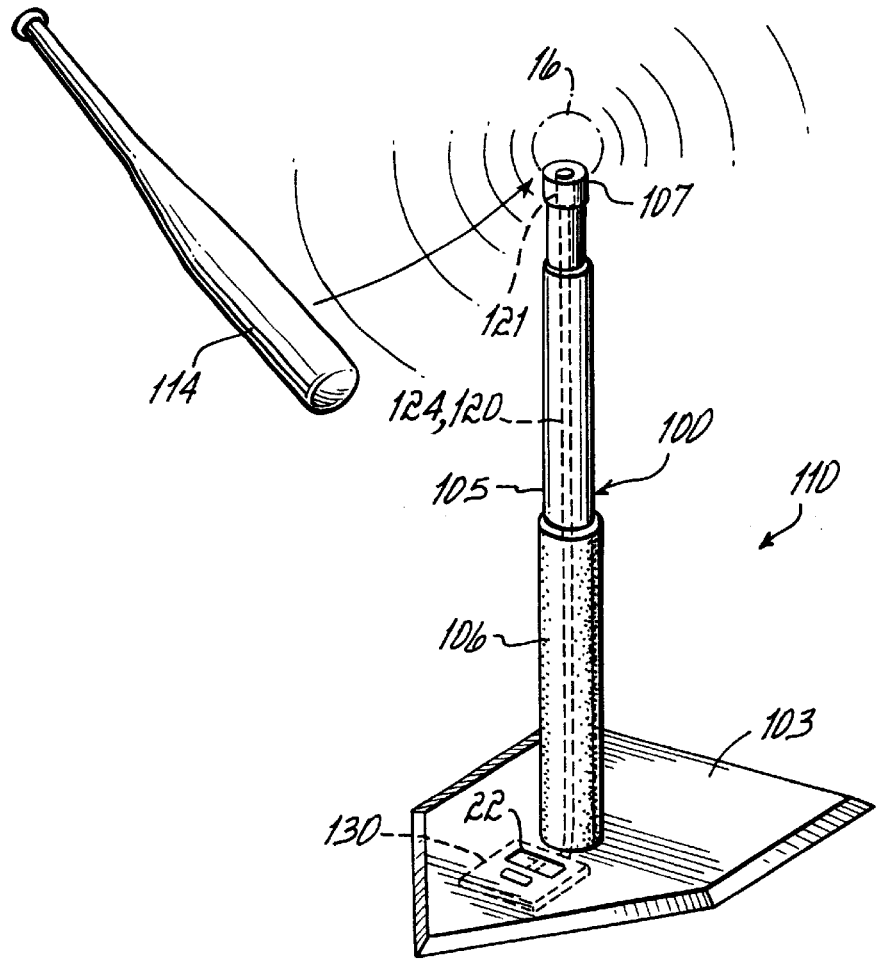
FIG. 4 is a perspective view of an alternative embodiment of the speed measuring devices of FIGS. 1–3 for measuring bat swing speed and utilizing the remote antenna circuitry feature of FIG. 3A.

FIG. 4 illustrates a batting tee 100 which incorporates an alternative embodiment of the speed measuring device 10 in the form of a bat speed measuring device 110. The batting tee 100 includes a base 103, which may be a home plate as illustrated, from which extends an upstanding post 105. The post 105 has a flexible link 106 therein and a ball supporting free end 107 at the top thereof. In use, a batter places the baseball 16 on the free end 107 of the post 105 and swings at it with a bat 114.

The device 110 includes a fixed length antenna radiating element 121 which replaces the antenna radiating element 21 a of circuit board 33 of the embodiment of FIG. 3. The antenna radiating element 121 is contained inside of the post 105 at the top end 107 thereof and is directed toward the rear of the plate or base 103 in the direction from which the bat 114 will approach the ball 16. The element 121 is located remote from the remaining circuitry 130 of the device 110, which includes the Doppler sensor circuit 50 of alternative circuit board 33a, as illustrated in FIG. 3A, as well as the signal processor circuit 34, the microprocessor 36 and other components similar to those of the circuitry of the device 10 illustrated in FIG. 3.

The antenna element 121 has a fixed radiating length and is connected to the RF detector circuit 50 on the circuit board 33a through a transmission line 120, such as a coaxial cable or parallel plate or wire transmission line having minimal radiation of the RF energy transmitted to and from the antenna. The transmission line 120 has a shield conductor 124 that is preferably grounded at a ground connection 125. The circuit 50 is tuned to the impedance of the line 120 to produce optimum operating efficiency in a conventional manner.

The unit 110 may be mounted in the base 103 in such a way that the display 22 is visible to the batter. Alternatively, the display 22 may be located remote from the unit 110 or may be the display or memory of a remote computer terminal and connected to the circuitry of the unit 110 in the base 103 by a cable or a wireless communications link.

Figure 5:
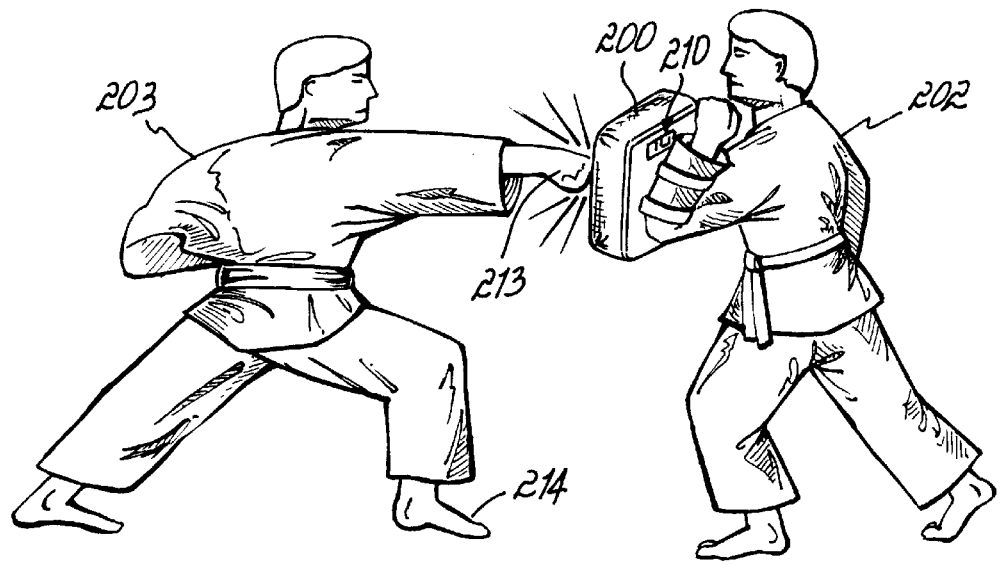
FIG. 5 is a perspective view of a further alternative embodiment of the speed measuring devices of FIGS. 1–4 for measuring punch and kick speed in martial arts training.
Figure 5A:
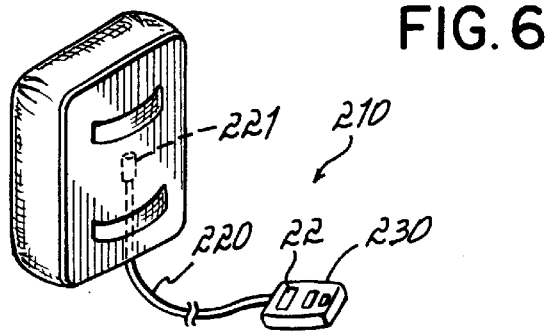
FIG. 5A is a perspective view of an alternative to the embodiment of FIG. 5.

In the embodiment of FIG. 5, measurement of the speed of human body parts is provided. A speed measurement unit 210, similar to the units 10, 110 described above, is located in a target pad 200 held by a trainer or coach 202 to measure the speed of punches and kicks from a person 203 in martial arts training. The entire unit 210 may be mounted on the back of target pad 200, or only an antenna radiating element 221. As with the element 121 in the embodiment above, the element 221 may be connected through a coaxial cable or other transmission line 220 to remaining circuitry 230 of the device 210, as illustrated in FIG. 5A, which includes the Doppler sensor circuit 50 of FIG. 3A, as well as the other components of the circuitry of the device 210 that are illustrated for the device 10 in FIG. 3. The energy radiated from the antenna element 221 passes through the pad 200 and is reflected back from the hand 213 or foot 214 of a boxer 201 who is punching or kicking the pad 200.

Figure 6:
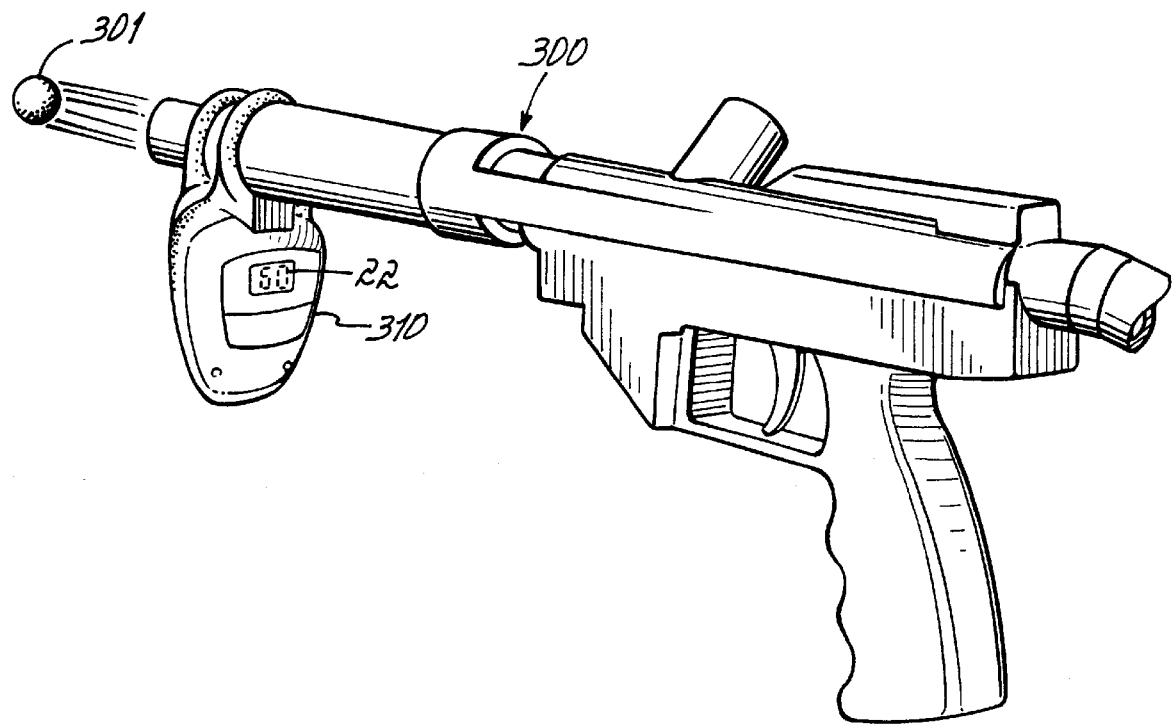
FIG. 6 is a perspective view of a still further alternative embodiment of the speed measuring devices of FIGS. 1–5 for measuring marker speed leaving the barrel of a paint ball gun.

In FIG. 6, an embodiment of a speed measurement device 310 is illustrated mounted on a paint ball gun 300 to measure the speed of a paint ball marker 301 shot from the gun. The device 310, so used, provides a way to calibrate the gun 300 so that the speed of the marker 301 approaches but does not exceed a maximum marker velocity limit of, for example, 300 feet per second. A self contained device 310 may be mounted on the barrel of the gun 300 as illustrated in FIG. 6, with the antenna directed in the direction in which the gun 300 is pointing, or a remote antenna element 321 may be mounted on the barrel close to the barrel centerline, with the remaining circuitry 33a located rearwardly of the antenna element 121 and connected to the antenna 121 through the transmission line 120.

Other applications of the invention can be made. Those skilled in the art will appreciate that the applications of the present invention herein are varied, and that the invention is described in preferred embodiments. Accordingly, additions and modifications can be made without departing from the principles of the invention. Accordingly, the following is claimed:

What is claimed is:

1. A method of measuring the speed of a moving sports object comprising the steps of:

providing a self-contained battery powered device that includes a transmitter/receiver, at least one antenna element, a transmission line connecting the at least one antenna element to the transmitter/receiver, a signal processor having an input connected to the transmitter/receiver, and an output annunciator having an input connected to the signal processor, positioning the at least one antenna element in close proximity to the path of the moving object;

generating a Doppler signal proportional to the speed of the object by producing an RF signal with the transmitter/receiver, transmitting the RF signal to the antenna element and radiating the RF signal from the antenna element along the path of the moving object, reflecting the RF signal from the object, receiving the reflected signal with the antenna element, transmitting the reflected signal from the antenna element to the transmitter/receiver, and detecting the Doppler signal from the reflected signal with the transmitter/receiver;

processing the detected Doppler signal with the signal processor and producing therefrom a digital representation of the speed of the object; and outputting the digital representation of the speed of the object with the annunciator.

2. The method of claim 1 for measuring the speed of a marker shot from a paint ball gun having a barrel wherein:

the positioning step includes the step of providing a paint ball gun locating at the at least one antenna element adjacent to the barrel thereof proximate the path of markers shot from the barrel;

the locating step includes fixing the transmitter/receiver, processor and annunciator to the gun with the transmission line extending from the antenna element to the transmitter/receiver;

wherein, when a marker is shot from the gun, the speed of the marker leaving the barrel is output by producing an RF signal with the transmitter/receiver, transmitting the RF signal along the transmission line to the antenna element on the barrel and radiating the RF signal from the antenna element at the barrel along the path of the markers leaving the barrel, reflecting the RF signal from the marker, receiving the reflected signal with the antenna element at the barrel, transmitting the reflected signal from the antenna element along the transmission line to the transmitter/receiver, detecting the Doppler signal from the reflected signal with the transmitter/receiver, processing the detected Doppler signal with the signal processor and producing therefrom a digital representation of the speed of the marker leaving the barrel, and outputting the digital representation of the speed with the annunciator.

3. The method of claim 1 further comprising:

locating the transmitter/receiver, processor and annunciator remote from at least one antenna element with the transmission line extending therebetween;

the transmitting of the RF signal including transmitting the produced RF signal along the transmission line to the antenna element and the transmitting of the received reflected signal along the transmission line to the transmitter/receiver.

4. A method of measuring the speed of a marker shot from a paint ball gun having a barrel, the method comprising:

providing a transmitter/receiver, at least one antenna element connected to the transmitter/receiver, a signal processor having a processor input connected to the transmitter/receiver, and a visual display having a display input connected to the signal processor;

positioning the at least one antenna element adjacent to the barrel of a paint ball gun in close proximity to the path of markers shot from the barrel;

when a marker is shot from the gun, displaying on the display a digital representation of the speed of the marker leaving the barrel by producing an RF signal with the transmitter/receiver, transmitting the RF signal via the antenna element and radiating the RF signal from the antenna element adjacent the barrel along the path of the marker leaving the barrel, reflecting the RF signal from the marker from the barrel, the reflected RF signal containing a Doppler signal related to the speed of the marker moving away from the barrel, receiving the reflected signal with the antenna element adjacent the barrel, communicating the reflected signal from the antenna element to the transmitter/receiver, detecting the Doppler signal from the reflected signal with the transmitter/receiver, processing the detected Doppler signal with the signal processor and in response thereto outputting a digital representation of the speed of the marker leaving the barrel on the display.

5. The method of claim 4 further comprising:

adjusting the paintball gun in response to the detected Doppler signal.

* * * * *